April 28, 1953          H. N. STEPHAN          2,636,327
METHOD OF MANUFACTURING HORIZONTAL
BORING, DRILLING, AND
MILLING MACHINES Filed Aug. 22, 1950          2 SHEETS—SHEET 2

INVENTOR.
BY HALLIS N. STEPHAN
Hudson, Boughton,
Williams, David & Hoffmann.
ATTORNEYS Patented Apr. 28, 1953

2,636,327

UNITED STATES PATENT OFFICE 2,636,327

METHOD OF MANUFACTURING HORIZONTAL BORING, DRILLING, AND MILLING MACHINES

Hallis N. Stephan, Cleveland Heights, Ohio, assignor to The New Britain Machine Company, New Britain, Conn., a corporation of Connecticut Application August 22, 1950, Serial No. 180,848

2 Claims. (Cl. 51—281)

The present invention relates to machine tools, such as, horizontal boring, drilling, milling machines and the like and, more particularly, to the construction of the ways of such machines.

In horizontal boring, drilling and milling machines, the cutting or working operation is performed by a tool carried upon the projecting end of a rotatable, horizontal tool spindle or boring bar supported in a spindle head and reciprocable lengthwise therein. The spindle head is, in turn, supported for vertical movement along a column with the projecting end of the tool spindle overlying a work table supported for movement longitudinally or transversely of the axis of the tool spindle upon a saddle movable longitudinally or transversely of the axis of the tool spindle upon a bed. The bed of the machine which is generally elongated is usually made of cast iron as is the saddle and table. The saddle is slidably supported upon upwardly facing, horizontal ways formed on the top of the cast iron bed and extending lengthwise thereof and the table is supported in a similar manner upon horizontal ways formed on the top of the cast iron saddle.

In machines of the character referred to as well as in other types of machines comprising a machine tool element slidably supported upon ways and particularly a relatively heavy machine tool element slidably supported upon horizontal ways formed on a cast iron member, it is difficult to accurately position the movable machine tool element in a predetermined desired location because of the initial friction of the ways partly due to the fact that while the machine tool element is at rest the oil drains or is squeezed from between the way surfaces and a metal to metal contact occurs.

The principal object of the invention is the provision of a novel and improved method of manufacturing a horizontal boring, drilling and milling machine and particularly the bed thereof, which comprises providing a member adapted to support a machine tool element, attaching hardened steel ways to the member, and forming bearing surfaces on the hardened steel ways for supporting the machine tool element by hand grinding the hardened steel ways to the desired fit with the machine tool element to a predetermined finish such that the machine tool element supported thereon can be readily and accurately positioned at a predetermined place.

The invention resides in certain constructions and combinations and arrangements of parts and further objects and advantages will be apparent to those skilled in the art to which it relates from the following description of the preferred embodiment described with reference to the accompanying drawings forming a part of this specification, in which similar reference characters designate corresponding parts, and in which Fig. 1 is a perspective view of a horizontal boring, drilling and milling machine embodying the present invention;

Figure 1:
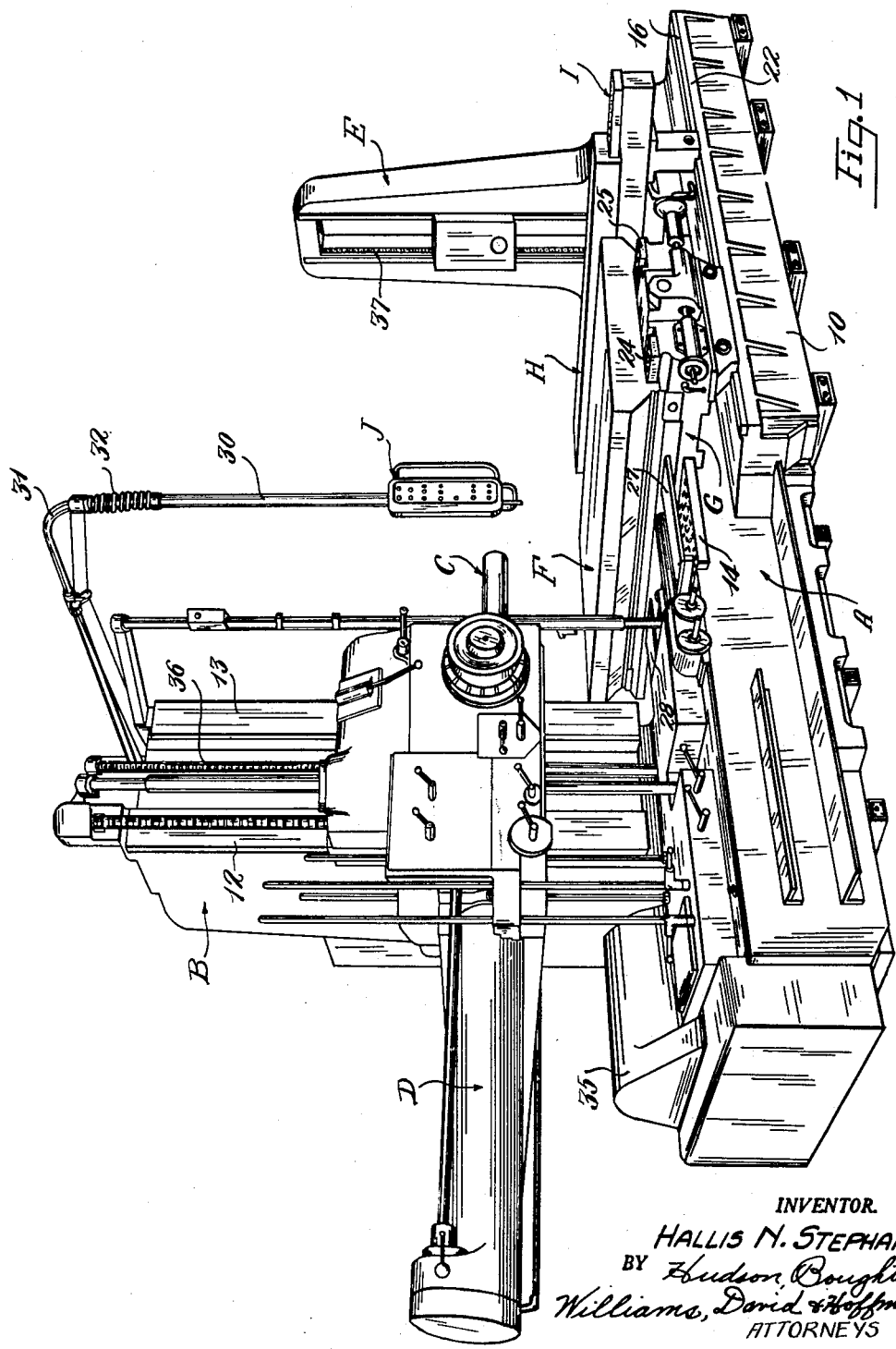
Figure 2:
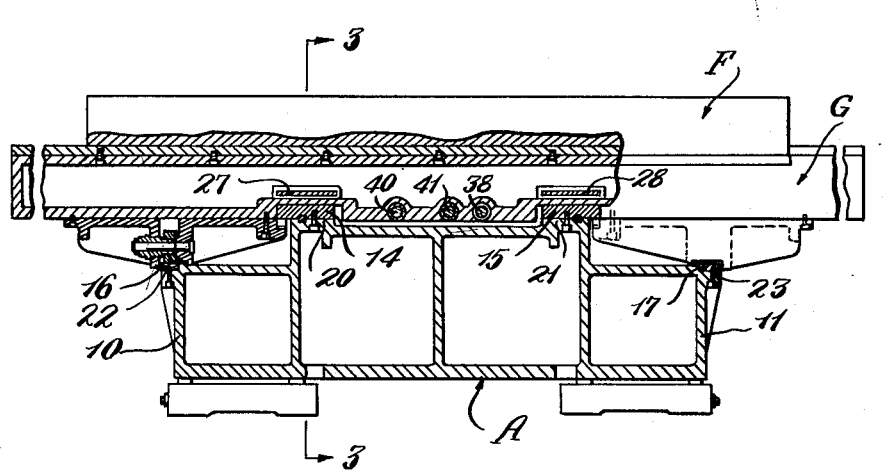
Fig. 2 is a transverse, vertical, sectional view through the bed of the machine immediately in front of the saddle, as viewed in Fig. 1.
Figure 3:
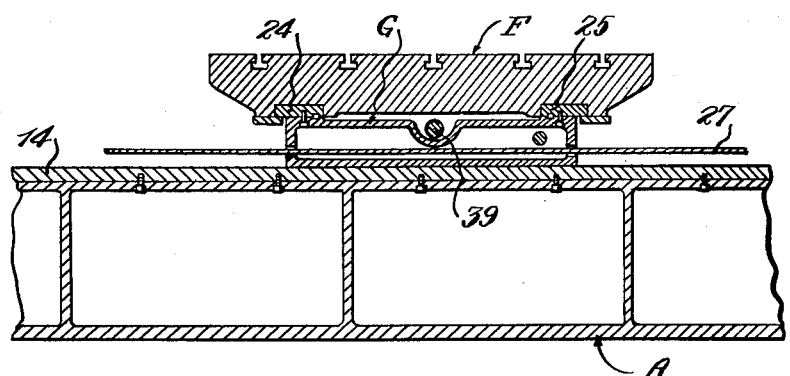
Fig. 3 is a fragmental sectional view through the table and saddle of the machine, taken in a vertical plane longitudinally of the machine approximately on the line 3—3 of Fig. 2.

While the invention is susceptible of various modifications and alternative constructions, it is herein shown and described as embodied in a horizontal boring, drilling and milling machine similar to that shown in U. S. Patent No. 2,339,435, issued January 18, 1944, and only those parts of the machine which are necessary to an understanding of the present invention are shown in the drawings and described herein in detail.

Referring to the drawings, the machine shown comprises a base A provided with a spindle head column B adjacent to one end thereof and including horizontal extensions or projections 10, 11 at opposite sides thereof formed integral therewith and extending from the right-hand end of the machine as viewed in Fig. 1 to a point adjacent to the spindle head column. The extensions 10, 11 of the bed are approximately half the height of the bed proper. The tool spindle C is supported for rotation about a horizontal axis in a spindle head D slidably supported by means including vertical ways 12, 13 for vertical movement along the front face of the spindle head column B.

An outboard or backrest support column E is located adjacent to the opposite end of the bed A and is slidably supported for linear movement toward and from the spindle head column B upon upwardly facing, horizontal main and auxiliary saddle supporting ways in the form of hardened steel strips 14, 15 and 16, 17, respectively, on the bed A attached to the upper surface of slightly raised portions or pads 20, 21 and flanges 22, 23, respectively, on the bed A and extending longitudinally thereof from the right-hand end of the machine approximately to the spindle head column B. The extensions 10, 11 and the main saddle supporting ways are substantially coextensive in length except for the left-hand end of the front extension 10 which is shortened to facilitate movement of the operator.

The work is adapted to be supported upon a table F, which table is, in turn, slidably supported for movement transversely of the axis of the spindle upon table supporting ways formed by hardened steel springs 24, 25 fastened to the top of a saddle G located intermediate the spindle head column B and the backrest column E and movable therebetween along the saddle supporting ways 14, 15, 16, 17. In addition to the main table F, the machine shown includes an auxiliary table H slidably supported for movement transversely of the length of the spindle upon an auxiliary saddle I supported and movable on the bed A in a manner similar to that in which the main saddle G is supported and movable thereon. The main saddle supporting ways 14 and 15 are covered by conventional way guards 27 and 28, respectively, which way guards project through suitable openings in the backrest column, main saddle and auxiliary saddle; that it, the machine elements E, G and I.

In the machine shown, the different movements of the various machine elements, such as the rotation and reciprocation of the spindle C, and the reciprocation of the spindle head D, saddles G and I, tables F and H, etc., may be effected by power and controlled from a pendant control station J fixed to the lower end of a tube 30 connected to a universally movable arm 31 by a flexible tube or conduit 32. Various rates of feed and spindle speeds can be selected by the various levers on the spindle head D, etc. With the exception of the extensions 10 and 11 of the bed A and the construction of the saddle supporting ways 14, 15, 16, 17 and the table supporting ways 24, 25, the machine shown is similar to that disclosed in the aforesaid patent to which reference is made for a complete description thereof.

While the means for moving the spindle head, backrest block, saddle and table are not herein shown and described in detail, machines of the character referred to are well-known in the art and reference to the aforesaid patent will show that feed movements are imparted to the various machine tool elements by an electric motor housed within the cover 35 and operatively connected to screws 36 and 37, 38 and 39 which move the spindle head and backrest block, saddle and table, respectively, by a feed change transmission of the gear type and a plurality of shafts, including splined shafts 40, 41, extending from the spindle head column B to the right-hand end of the machine. The feed motor may be selectively connected to the spindle head and backrest block screws 36 and 37 or the saddle screw 38 or the table screw 39 in a manner disclosed in the aforesaid patent. Attention is called to the fact that the screws which move the spindle head D, the backrest block and the saddle are relatively long, as is the shaft 41 which transmits power to the table screw 39.

As is well known to those skilled in the art to which the invention relates, the drives for the various machine tool elements are inherently elastic to a small extent which because of the relatively heavy weight of the elements moved thereby and particularly the saddle, makes it difficult to accurately position the movable machine tool elements in a predetermined desired location. This difficulty is overcome in the present instance by the provision of novel and improved ways for the movable machine tool elements and particularly for the saddle which is the heaviest of the elements employed and which rests directly on its ways as distinguished from the vertically movable elements, the weight of which is supported largely, if not entirely, by the screws which move the same.

According to the provisions of the present invention, the saddle supporting ways 14, 15, 16, 17 are made of hardened surfaces, preferably hardened steel strips bolted or otherwise suitably attached to the upper surface of the bed A; in the present instance to the upper surface of the raised portions or pads 20, 21, 22, 23 of the bed. The hardened ways or steel strips, as the case may be, preferably have a hardness of Rockwell C51 and even more, and are, therefore, too hard to scrape in the conventional manner to a desired accuracy and fit with the saddle when the machine is assembled. In the present instance, the hardened bed ways are made level and flat, as by grinding on a surface grinding machine. Thereafter the way surfaces are made extremely flat by grinding with a hand disk grinder. During this operation the surface is intermittently checked with or against a surface plate. After the desired flatness is obtained the bearing surfaces on the saddle are scraped or ground to fit the bed ways. After a perfect fit is obtained, macroscopic oil pockets are formed in the bearing or slide surfaces of the bed way by hand grinding the ways with a suitable grinding machine, for example, a portable or hand grinding machine, using a relatively small beveled grinding wheel 43, preferably between 1 and 2 inches in diameter and beveled to a 45° pattern or angle, similar to that shown in Fig. 4. Alternatively a disk or face-type grinding wheel 44, one or two inches in diameter, may be used, see Fig. 5.

After grinding in the aforesaid manner, the bearing surfaces of the ways have all of the advantages of hand-scraped ways and in addition are much harder. The bearing surfaces are broken by a multiplicity of small curved or arcuately-shaped macroscopic indentations 42, preferably approximately about .001" to .005" or more deep, which indentations retain small quantities of lubricant. This feature, together with the fact that the bearing surface is harder than that of a conventional, hand-scraped, cast-iron way eliminates or greatly reduces the tendency of the saddle to stick or "freeze" to its ways, reduces the power required to move the saddle and allows the saddle to be easily positioned either by hand or by power at a desired location.

Figures 4, 5:
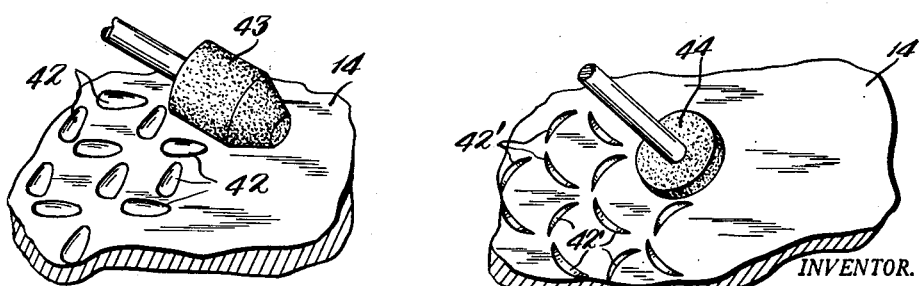
Figs. 4 and 5 are enlarged, fragmentary, perspective views of one of the saddle supporting ways on the bed of the machine, showing two forms of grinding wheels which are suitable for performing the present method.

The shape of the indentations 42 depends upon the shape and size of the grinding wheel employed and the manner in which it is used. When a wheel similar to that shown in Fig. 4 is employed the indentations are more or less oval in shape and are preferably about ¾" long and ⅜" wide. Moon shape indentations of about the same length are produced by using a wheel similar to that shown in Fig. 5 in the manner illustrated. The indentations 42 may be arranged in a regular pattern or not as desired.

The ways for the table are preferably similarly constructed, as are the ways for the spindle head, if desired.

Satisfactory ways of the character referred to cannot be produced by conventional surface grinding. In the first place, they cannot be ground accurately enough for precision machine tools; for example, those used for making jigs and fixtures, and, secondly, smooth or regular surfaces of the type produced by surface grinding tend to freeze together and will not easily slide relative to each other.

From the foregoing, it will be apparent that the objects of the invention heretofore enumerated and others have been accomplished and that there has been provided a new and improved, horizontal boring, drilling and milling machine so constructed and arranged that the movable machine tool elements thereof can be readily positioned in a predetermined location, together with a novel and improved method of manufacturing machines of the character referred to. While the preferred embodiment of the invention has been described in considerable detail, I do not wish to be limited to the particular construction shown and it is my intention to cover hereby all adaptations, modifications and uses thereof which come within the practice of those skilled in the art to which the invention relates.

Having thus described my invention, I claim:

1. The method of manufacturing a horizontal boring, drilling and milling machine having a movable machine tool element supported upon a cast iron member, which method comprises providing hardened ways on the cast iron member, grinding said ways with a hand disk grinder and checking the ways against a surface plate until they are level or flat, thereafter abrading the cooperating bearing surfaces on the movable machine tool element to said ways and hand grinding the ways to produce thereon a multiplicity of shallow arcuately-shaped macroscopic depressions.

2. The method of manufacturing a horizontal boring, drilling and milling machine having a movable machine tool element supported upon a cast iron member, which method comprises attaching hardened steel ways to the cast iron member, grinding said ways with a hand disk grinder and checking the ways against a surface plate until they are level or flat, thereafter abrading the cooperating bearing surfaces on the movable machine tool element to said ways and hand grinding the ways to produce thereon a multiplicity of shallow arcuately-shaped macroscopic depressions.

HALLIS N. STEPHAN.

References Cited in the file of this patent

UNITED STATES PATENTS

| Number | Name | Date |
| --- | --- | --- |
| 1,476,949 | Cardullo | Dec. 11, 1923 |
| 2,014,667 | Potter | Sept. 17, 1935 |
| 2,092,587 | Olson | Sept. 7, 1937 |
| 2,167,609 | Dolle | July 25, 1939 |
| 2,282,145 | Indge | May 5, 1942 |

FOREIGN PATENTS

| Number | Country | Date |
| --- | --- | --- |
| 313,640 | Great Britain | June 10, 1929 |